(12) United States Patent
Lee et al.

(10) Patent No.: US 10,181,889 B1
(45) Date of Patent: Jan. 15, 2019

(54) COMMUNICATION METHOD USING OUTDATED CHANNEL STATE INFORMATION IN G-CELL AND 2-USER CELLULAR NETWORK

(71) Applicants: LG ELECTRONICS INC., Seoul (KR); KOREA ADVANCED INSTITUTE OF SCIENCE AND TECHNOLOGY, Daejeon (KR)

(72) Inventors: Kilbom Lee, Seoul (KR); Changho Suh, Daejeon (KR); Seiyun Shin, Daejeon (KR); Jaewoong Cho, Seoul (KR); Jiwon Kang, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/745,283

(22) PCT Filed: Aug. 10, 2015

(86) PCT No.: PCT/KR2015/008337
§ 371 (c)(1),
(2) Date: Jan. 16, 2018

(87) PCT Pub. No.: WO2017/010599
PCT Pub. Date: Jan. 19, 2017

(30) Foreign Application Priority Data

Jul. 16, 2015 (KR) .................... 10-2015-0101263

(51) Int. Cl.
*H04B 7/26* (2006.01)
*H04B 7/06* (2006.01)
*H04B 17/24* (2015.01)
*H04B 17/364* (2015.01)
*H04B 17/345* (2015.01)

(52) U.S. Cl.
CPC .......... *H04B 7/0626* (2013.01); *H04B 17/24* (2015.01); *H04B 17/345* (2015.01); *H04B 17/364* (2015.01); *H04B 7/2643* (2013.01)

(58) Field of Classification Search
CPC .. H04B 7/0626; H04B 17/345; H04B 17/364; H04B 17/24; H04B 7/2643
See application file for complete search history.

(56) References Cited

U.S. PATENT DOCUMENTS

| | | | |
|---|---|---|---|
| 8,223,626 B2 | 7/2012 | Au et al. | |
| 2008/0240308 A1* | 10/2008 | Lee | H04L 25/0224 375/343 |

(Continued)

FOREIGN PATENT DOCUMENTS

| | | |
|---|---|---|
| KR | 10-2011-0009025 A | 1/2011 |
| KR | 10-2012-0047759 A | 5/2012 |

(Continued)

*Primary Examiner* — Dac V Ha
(74) *Attorney, Agent, or Firm* — Birch, Stewart, Kolasch & Birch, LLP (57) ABSTRACT

Disclosed is a communication method using outdated channel state information in a network environment having a G-cell and 2-user terminal, by allowing a terminal and base stations to transmit and receive data symbols for G time slots, and to transmit and receive a reconfiguration signal for an additional one time slot.

11 Claims, 5 Drawing Sheets

(56) References Cited

U.S. PATENT DOCUMENTS

| | | | | |
|---|---|---|---|---|
| 2014/0226508 A1* | 8/2014 | Asplund | ............... | H04L 1/002 370/252 |
| 2017/0085326 A1* | 3/2017 | Li | ................... | H04B 17/345 |
| 2017/0264466 A1* | 9/2017 | Hosseini | ............. | H04L 25/021 |

FOREIGN PATENT DOCUMENTS

| KR | 10-2014-0102296 A | 8/2014 |
|---|---|---|
| KR | 10-2014-0123486 A | 10/2014 |

\* cited by examiner

COMMUNICATION METHOD USING OUTDATED CHANNEL STATE INFORMATION IN G-CELL AND 2-USER CELLULAR NETWORK

CROSS REFERENCE TO RELATED APPLICATIONS

This application is the National Phase of PCT international Application No. PCT/IKR2015/008337, filed on Aug. 10, 2015, which claims priority under 35 U.S.C. 119(a) to patent application Ser. No. 10-2015-0101263, filed in Republic of Korea on Jul. 16, 2015, all of which are hereby expressly incorporated by reference into the present application.

TECHNICAL FIELD

The present invention relates to a communication technology, and more particularly, to a method for a user equipment and a base station to communicate with each other using outdated channel state information in a cellular network environment including 2 users existing in each of G cells existing in the environment.

BACKGROUND ART

Interference is one of major causes of performance degradation in a wireless network environment. Particularly, such an interference problem is mainly caused in a multi-user environment in which several transmitting-receiving pairs exist. This is because a transmission signal simultaneously transmitted from each transmitter is delivered to non-intended receivers as well as to a target receiver. Many attentions have been paid to an interference alignment (IA) technology as a potential solution method for solving such an interference problem. The interference alignment technology was originally developed under the model of an interference channel between X-channel and K-user, and has been developed for various practically-relevant network models. Particularly, an interference alignment technology, which is capable of achieving the almost same performance as DoF (degree of freedom) performance under interference-free circumstances, under cellar network circumstances has been developed.

Although it is true that such interference alignment technologies contribute to increasing communication capacity, there exist various tasks to apply them to a real environment. One of the tasks is that a transmitter should be aware of current channel state information (CSI). In a related art FDD (frequency division duplex) communication system, as such channel informations are obtained from feedback from a receiver to a transmitter, a delay is generated due to additional requirement for receiving feedback. Hence, in a related art communication system, after predicting channel information based on such outdated channel state information (outdated CSI), an interference alignment technology is applied based on the predicted channel information. Yet, in a fast-fading scenario in which a channel environment changes fast, a current channel state may be totally different from a channel state predicted from feedback. In this case, a method of predicting a current channel state fails in improving communication capacity (DoF gain).

Yet, it turns out that communication capacity on multi-antenna broadcast channel can be improved with outdated channel state information. Namely, in a fast-fading environment in which a channel environment changes fast, although channel information fed back from a receiver is totally different from a current channel state, it is known that efficiency of communication can be improved using such channel information. If communication performance under such extreme circumstances is improved to be better than that of a case of no channel information, efficiency of communication can be improved in any environments using delayed outdated channel information.

DISCLOSURE OF THE INVENTION

Technical Tasks

The present invention is directed to solve the above problems of the general technology, and one technical task of the present invention is to improve efficiency of communication using delayed outdated channel information.

Another technical task of the present invention is to achieve improvement of communication efficiency in a network environment in which the number of user equipments and the number of cells change.

Further technical task of the present invention is to obtain a DoF gain higher than that of a case of not using outdated channel information.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In one technical aspect of the present invention, provided herein is a communication method performed by a first user equipment located at a first cell using outdated channel information in a network environment including G cells (where G is an integer equal to or greater than 3) in each of which 2 user equipments are located, the communication method including transmitting G different data symbols to a first base station in each time slot during a first time period including G time slots, receiving a feedback signal including channel information on the transmitted data symbols, stopping transmission of data during second to $G^{th}$ time periods, each including G time slots, and transmitting a reconfigured signal generated on the basis of the feedback signal during a $(G+1)^{th}$ time period including $[G*(G-1)/2]$ time slots.

The transmitting the reconfigured signal may transmit the reconfigured signal in (G−1) time slots during the $(G+1)^{th}$ time period.

The transmitting the reconfigured signal may transmit the reconfigured signal in each of the (G−1) time slots together with first user equipments included in (G−1) cells except the first cell.

During the first time period, a second user equipment included in the first cell may transmit (G−1) different data symbols to the first base station in each of (G−1) time slots and also transmit a sum of the (G−1) different data symbols to the first base station in 1 time slot.

A second user equipment included in the first cell may stop transmission of data during the $(G+1)^{th}$ time period.

In another technical aspect of the present invention, provided herein is a communication method performed by a first base station located at a first cell using outdated channel information in a network environment including G cells (where G is an integer equal to or greater than 3) in each of which 2 user equipments are located, the communication method including receiving G different data symbols from a first user equipment located at the first cell in each time slot during a first time period including G time slots, during the first time period, receiving (G−1) different data symbols in each of (G−1) time slots and a sum of the (G−1) different data symbols in 1 time slot, during second to $G^{th}$ time periods, each including G time slots, receiving signals transmitted by user equipments located at second to $G^{th}$ cells as interference signals, receiving a first reconfigured signal from the first user equipment during a $(G+1)^{th}$ time period including [G*(G−1)/2] time slots, during the $(G+1)^{th}$ time period, receiving a second reconfigured signal from a different user equipment located at one of the second to $G^{th}$ cells, and decoding data symbols received during the first time period based on the interference signals, the first reconfigured signal and the second reconfigured signal.

The communication method may further include transmitting a feedback signal including channel information on signals received during the first time period to each of the first user equipment and the second user equipment, and the first reconfigured signal may be generated based on the feedback signal.

The communication method may further include performing a nulling process on (G−1) interference signals received during the second to $G^{th}$ time periods and saving (G−1) data generated through the nulling process as side information.

The receiving the first reconfigured signal and the receiving the second reconfigured signal may include receiving reconfigured signals in (G−1) time slots during the $(G+1)^{th}$ time period.

The receiving the first reconfigured signal and the receiving the second reconfigured signal may include receiving a pair of reconfigured signals from the first user equipment and the different user equipment in each of the (G−1) time slots.

The decoding may include processing a pair of the reconfigured signals into a signal related to a single user equipment only using the side information and obtaining (G−1) additional informations for decoding the data symbols by performing the processing on (G−1) side informations and the reconfigured signal pair.

Advantageous Effects

According to embodiments of the present invention, the following effects are expected.

First of all, it is able to secure higher communication efficiency by utilizing delayed outdated channel information.

Secondly, as performance improvement is achieved in a situation that a channel environment changes fast, performance robust to a network environment change can be further improved in comparison with a case of not using outdated channel information.

Thirdly, as performance is increasingly improved in proportion to the number of cells, overall communication capacity can be raised.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In the present specification, the embodiments of the present invention have been described centering on the data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term 'base station' may be replaced with such a term as a fixed station, a Node B, an eNode B (eNB), an advanced base station (ABS), an access point, etc.

The term 'mobile station (MS)' may be replaced with such a term as a user equipment (UE), a subscriber station (SS), a mobile subscriber station (MSS), a mobile terminal, an advanced mobile station (AMS), a terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink, a mobile station becomes a receiver and a base station becomes a transmitter.

Device's communication with a "cell" may mean that the device transceives a signal with a base station of the corresponding cell. That is, although a device may substantially transceive a signal with a specific base station, for clarity, an expression "transceiving a signal with a cell formed by the specific base station" may be used instead. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the obvious steps or parts undescribed in the embodiments of the present invention can be described by referring to the above documents.

In addition, all the terms disclosed in the present document may be described by the above standard documents. In particular, the embodiments of the present invention may be supported by at least one of P802.16-2004 P802.16e-2005 P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment capable of implementing the present invention.

It should be noted that specific terms disclosed in the present invention are proposed for convenience of description and better understanding of the present invention, and the use of these specific terms may be changed into other forms within the scope of technical idea of the present invention.

Figure 1:
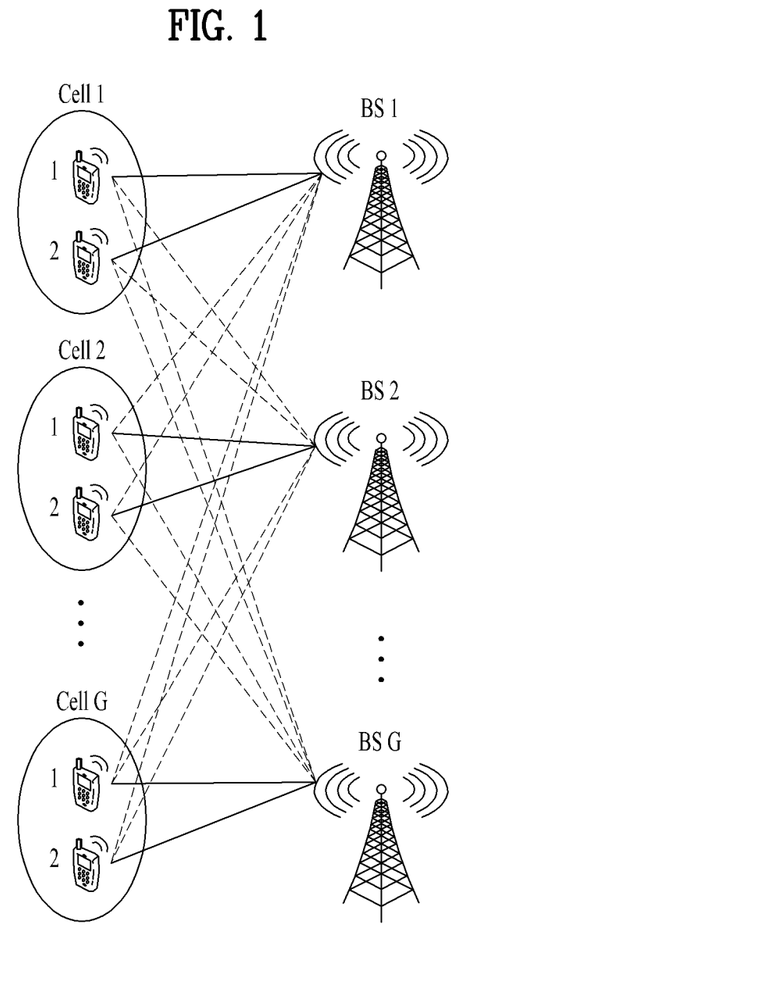
FIG. 1 is a diagram illustrating a G-cell and 2-user uplink channel model related to the present invention.

FIG. 1 is a diagram illustrating a G-cell and 2-user uplink channel model related to the present invention.

A channel model shown in FIG. 1 depicts a situation of UL (uplink) communication, in which 2 users exist in each of G cells (where G is equal to or greater than 3). Assume that each of a user equipment (UE) (i.e., a transmitter) and a base station (i.e., a receiver) has a single antenna. Users of cells 1 to G send UL signals to base stations 1 to G, respectively. And, each of the base stations receives both preferred signals and interference signals from the users of the various cells.

For example, the base station 1 is described as follows. The base station 1 receives preferred signals (denoted by solid lines) from a user 1 and a user 2 located within the cell 1 and also receives signals sent to the base station 2 from a user 1 and a user 2 located within the cell 2 as interference signals (denoted by doted lines). Likewise, the base station 1 receives signals sent to the base station G from a user 1 and a user 2 located within the cell G as interference signals.

In a manner similar to the above manner that the base station 1 receives the preferred signals and the interference signals together, the base stations 2 to G receive preferred signals and interference signals together. Namely, while receiving the preferred signals from the users located within the cell 2, the base station 2 receives UL signals from users located within other cells as interference signals. Such interference signals are received in a manner that a base station overhears UL signals sent toward neighbor base stations located adjacent to the corresponding base station.

Described in the following is a communication method for achieving DoF equal to or greater than 1 in a manner that each base station processes a received signal using outdated channel information in the G-cell and 2-user scenario shown in FIG. 1. The proposed communication method is performed by a series of time period units, and each time period is described as represented as a phase. The phase meaning a prescribed time period includes a plurality of time slots. A time slot means a time unit taken to transmit a single data symbol, and a time period (i.e., phase) includes two or more time slots. A data symbol means a transmission unit of data.

Figure 2:
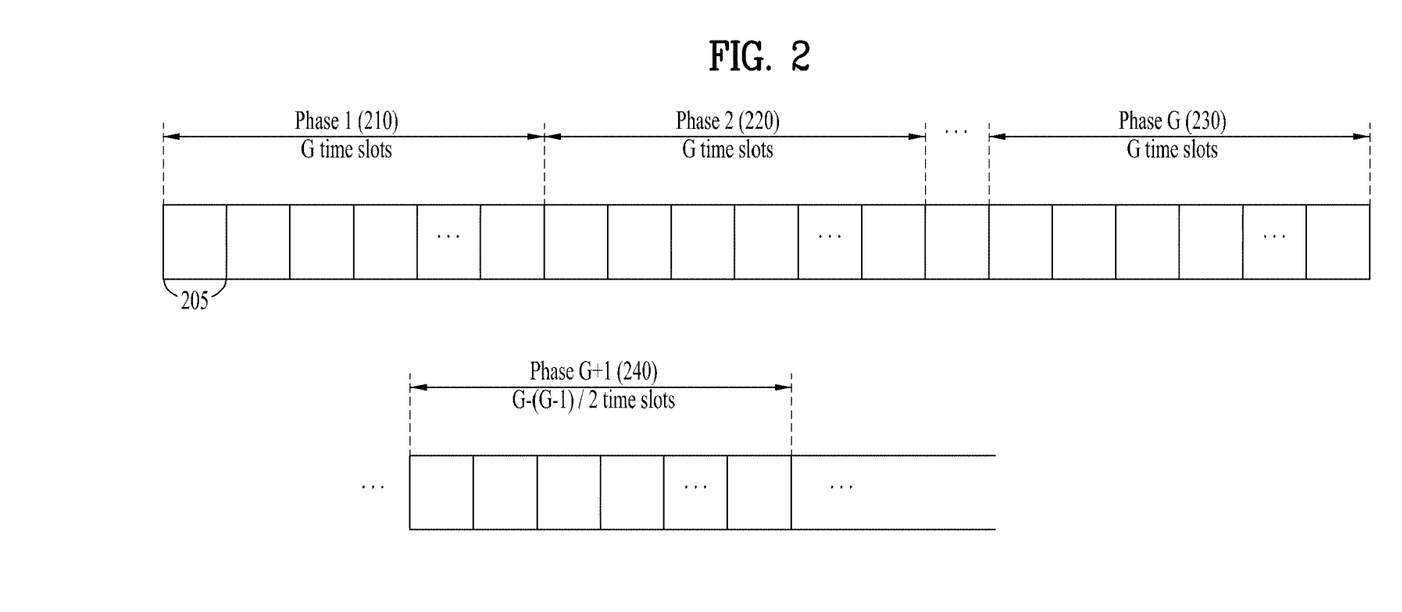
FIG. 2 is a diagram illustrating a structure of a time period related to one embodiment of the present invention.

FIG. 2 is a diagram illustrating a structure of a time period related to one embodiment of the present invention. As described above, a series of communication method operates in a manner that total (G+1) phases including a phase (i.e., time period) 1 210 to a phase G 230 are set to a single cycle. Each of the phases 1 to (G+1) 210 to 240 includes G time slots 205, and G data symbols can be transmitted in each phase. On the other hand, the phase (G+1), i.e., the last phase includes [G*(G-1)/2] time slots.

First of all, the phase 1 210 is described. As described above, the phase 1 210 includes G time slots. UE 1 and UE 2 located within a cell 1 in the phase 1 send UL signals to a base station 1, but UEs located in the cells 2 to G do not sent any signals. The UE 1 of the cell 1 sends G data symbols different from each other during G time slots, and more particularly, a single data symbol per time slot. The UE 2 of the cell 1 sends (G-1) data symbols different from each other during (G-1) time slots among the G time slots and also sends a value, which results from adding the previously sent (G-1) data symbols together, in the last single time slot.

Data symbols sent by the UEs located at the cell 1 in the phase 1 210 may be summarized as Formula 1 in the following.

$$\begin{array}{ccccc} t=1 & t=2 & \ldots & t=G-1 & t=G \\ s_{11}^{(1)} & s_{11}^{(2)} & \ldots & s_{11}^{(G-1)} & s_{11}^{(G)} \\ s_{12}^{(1)} & s_{12}^{(2)} & \ldots & s_{12}^{(G-1)} & s_{12}^{(1)}+s_{12}^{(2)}+\ldots+s_{12}^{(G-1)} \end{array} \quad \text{[Formula 1]}$$

In Formula 1, $S_{ij}$ indicates a data symbol sent by a user j of a cell i. And, an upper subscript indicates a time slot in which each data symbol is sent.

Meanwhile, data symbols transmitted in each time slot of the phase 1 are received by base stations in a manner of being multiplied by a channel coefficient. Namely, the base station 1 receives signals transmitted by the users 1 and 2 as preferred signals. And, the base stations 2 to G receive the same signal as an interference signal. If the time slot 1 is taken as an example, a signal received by each base station can be expressed as Formula 2.

$$\begin{aligned} Bs1 & \quad h_{11\to 1}[1]s_{11}^{(1)}+h_{12\to 1}[1]s_{12}^{(1)} \\ Bs2 & \quad h_{11\to 2}[1]s_{11}^{(1)}+h_{12\to 2}[1]s_{12}^{(1)} \\ & \quad \vdots \\ BsG & \quad h_{11\to G}[1]s_{11}^{(1)}+h_{12\to G}[1]s_{12}^{(1)} \end{aligned}$$ [Formula 2]

In Formula 2, $h_{ij\to k}[t]$ means a channel coefficient for a data symbol transmitted to a base station k by a user j of a cell i in a time slot t (e.g., 1 in the present example).

In the phase 1, the number of data symbols the base station 1 intends to receive and decode is total [G+(G−1)] resulting from adding G symbols received from the user 1 and (G−1) symbols received from the user 2 together. The number of linear equations arriving at the base station 1 during G time slots of the phase 1 is G, and (G−1) equations are further required in order to decode the desired [G+(G−1)] symbols.

Meanwhile, signals received not by the base station 1 but by another base station k during G time slots of the phase 1 can be expressed as Formula 3.

$$y_k[1]=\begin{bmatrix} h_{11\to k}[1] & \cdots & 0 \\ \vdots & \ddots & \vdots \\ 0 & \cdots & h_{11\to k}[G] \end{bmatrix}\begin{bmatrix} 1 & \cdots & 0 \\ \vdots & \ddots & \vdots \\ 0 & \cdots & 1 \end{bmatrix}\begin{bmatrix} s_{11}^{(1)} \\ \vdots \\ s_{11}^{(G)} \end{bmatrix}+$$

$$\begin{bmatrix} h_{12\to k}[1] & \cdots & 0 \\ \vdots & \ddots & \vdots \\ 0 & \cdots & h_{12\to k}[G] \end{bmatrix}\begin{bmatrix} 1 & \cdots & 0 \\ \vdots & \ddots & \vdots \\ 1 & \cdots & 1 \end{bmatrix}\begin{bmatrix} s_{12}^{(1)} \\ \vdots \\ s_{12}^{(G-1)} \end{bmatrix},\ (k\neq 1)$$ [Formula 3]

Formula 3 can be simply expressed as Formula 4 that is a determinant consisting of matrixes.

$$y_k[1]=H_{11\to k}[1]V_{11}[1]X_{11}[1]+H_{12\to k}[1]V_{12}[1]X_{12}[1],$$
$$(k\neq 1)$$ [Formula 4]

In Formula 4, V means a precoder vector) and X means a vector of a data symbol.

Meanwhile, in the last time slot G of the phase 1, the UE 2 of the cell 1 sends a sum of symbols previously sent in (G−1) time slots. Hence, a random base station k (k≠1) can generate a null space vector for interference signals received by the random base station using signals received during G time slots, and is able to find a term consisting of symbols for the UE 1 of the cell 1 only by applying the null space vector to the interference signal. Information generated through the above nulling process is named side information, and each base station generates and saves side information through the nulling process. Formula 5 indicates a null space vector $u_k^T$ generated by a base station k.

$$\exists u_k^T,\ \text{which is}\ u_k^T H_{12\to k}[1]V_{12}[1]X_{12}[1]=0$$ [Formula 5]

The base station k can find a term related to the UE 1 of the cell 1 only like Formula 6 by multiplying the null space vector to the interference signal as described in Formula 4 and then save it as side information.

$$S_{1k}=u_k^T y_k[1]=u_k^T H_{11\to k}[1]V_{11}[1]X_{11}[1]$$ [Formula 6]

The above process is performed by each of the (G−1) base stations except the base station 1 using interference signals. In Formula 6, $S_{ik}$ means the side information needed by the base station i by being saved to the base station k.

Meanwhile, if a series of the process related to the above-described phase 1 is ended, a phase 2 200 proceeds. In the phase 2, UE 1 and UE 2 included in the cell 2 send UL signals to the base station 2 during G time slots. UEs located in cells other than the cell 2 do not send data. The UE 1 of the cell 2 sends G data symbols different from each other during G time slots. The UE 2 of the cell 2 sends (G−1) data symbols during (G−1) time slots and also sends a sum of (G−1) data symbols in the last 1 time slot.

Similarly to the base station 1 of the phase 1 210, the base station 2 receives [G+(G−1)] data symbols in the phase 2 220. Meanwhile, in the phase 2 220, the base stations 1 and 3 to G except the base station 2 stand by for interference signals from UEs of the cell 2. Through a nulling process for the interference signals, the (G−1) base stations other than the base station 2 stores side information one by one.

A similar process is performed up to the phase G 230. As a result from performing the phases 1 210 to the phase G 230, every base station retains (G−1) side informations, each of which contains a term related to UE 1 of each cell only. Namely, G base stations retain total G(G−1) side informations, and a process for using side information in the phase (G+1) 240 is described as follows.

The phase (G+1) 240 includes total G(G−1)/2 time slots. A substantial gain of DoF using outdated information is generated from the phase (G+1) 240. In each time slot of the phase (G+1) 240, UEs 1 of two cells i and j among G cells generate $S_{ji}$ and $S_{ij}$ and then send them to base stations i and j, respectively.

As described in Formula 6, $S_{ji}$ and $S_{ij}$ are side informations related to UE 1 only. UEs receive feedbacks for signals previously sent by themselves and are able to obtain information on a channel coefficient from the feedback signal. Hence, UEs 1 of the cells i and j can reconfigure signals related to themselves only and send the reconfigured signals to the corresponding base stations, respectively.

The base station i receives the reconfigured signal from the UE 1 of the cell i and also receives the reconfigured signal from the UE 1 of the cell j as an interference signal. Meanwhile, the base station i already stores side information related to the UE 1 of the cell j only. Hence, the base station i can extract a preferred signal from the UE 1 of the cell i only using the reconfigured signal received from the cell j and the side information retailed by the base station i.

Similarly, if UEs 1 of cells i and k send reconfigured signals in another time slot, the base station i removes the reconfigured signal received as an interference signal from the UE 1 of the cell k by processing it together with the retained side information related to the UE 1 of the cell k only. Hence, the base station i can obtain an additional equation related to the UE 1 of the cell i only.

In each time slot of the phase (G+1) 240, 2 reconfigured signals are sent to a base station each, whereby UEs send total G(G−1) reconfigured signals during G(G−1)/2 time slots. Hence, in two of the entire base stations, 2 side informations are processed together with the reconfigured signal in each time slot. As the side information and the reconfigured signal are processed together, each base stations obtains an additional equation related to UEs located within the cell of the corresponding base station only.

Eventually, the (G−1) side informations retained by each of the entire G base stations are processed all during G(G−1)/2 time slots, and each base station can obtain (G−1) additional equations each. Hence, the entire G base stations obtain formulas enough to decode (G+G−1) symbols received during phases 1 to G (G*G=G² time slots), and all data symbols are decoded.

Therefore, DoF in the entire phases 1 to (G+1) is expressed as Formula 7.

$$G\{G+(G-1)\}/\{G^2+G(G-1)/2\}=(4G-2)/(3G-1) \quad \text{[Formula 7]}$$

In case of an environment in which a channel situation changes fast in FDD system, there is a case that channel information received through feedback becomes out-of-date (i.e., outdated) information completely having nothing to do with a current channel. According to the above-proposed method and algorithm, even in such an extreme case, it is able to achieve DoF of (4G−2)/(3G−1) using outdate channel information. This value is a value greater than 1 that is DoF when a transmitter has no channel information. Moreover, it can be observed that DoF gain increases in proportion of the number G of cells.

Figure 3:
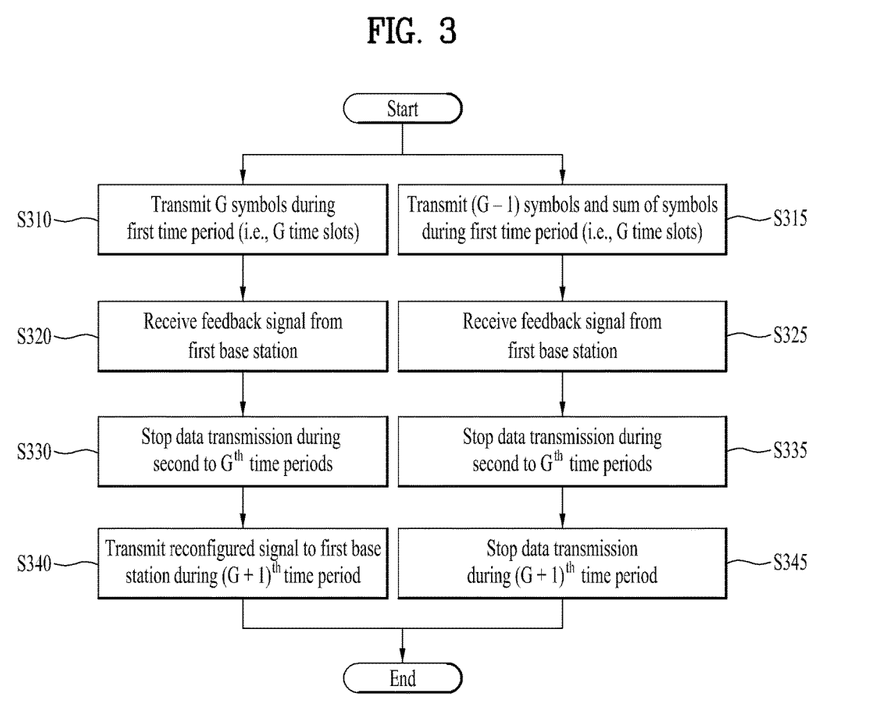
FIG. 3 is a diagram illustrating a method for a user equipment to communicate using outdated channel state information according to one embodiment of the present invention.

FIG. 3 is a diagram illustrating a method for a user equipment to communicate using outdated channel state information according to one embodiment of the present invention. Described in FIG. 3 is a series of process that UE 1 and UE 2 within a specific cell (Cell 1) operate in the aforementioned embodiment.

Since UE 1 and UE 2 within a cell operate in different ways, as described above, operating processes of the two UEs are separately illustrated and described. A left flowchart in FIG. 3 shows an operating process of the UE 1, and a right flowchart in FIG. 3 shows an operating process of the UE 2.

First of all, the UE 1 sends G data symbols to a base station during a first time period (i.e., phase 1) including G time slots [S310]. The UE 1 sends 1 data symbol in each time slot during the G time slots, thereby sending total G data symbols.

Subsequently, the UE 1 receives a feedback signal for the data symbols, which were sent in the first time period, from the base station [S320]. The feedback signal may include information on a channel coefficient for the data symbols sent by the UE 1.

Subsequently, having finished the data transmission during the first time period, the UE 1 stops data transmission during second to $G^{th}$ time periods [S330]. Namely, during the second to $G^{th}$ time periods, since UEs belonging to cells 2 to G send data, UEs belonging to the cell 1 do not take any actions.

Subsequently, in a $(G+1)^{th}$ time period, the UE 1 sends a reconfigured signal to the base station [S340]. The reconfigured signal is the signal generated using information on the channel coefficient included in the feedback signal received in the step S320. As describe above, the reconfigured signal is utilized together with side information retained by the base station.

On the other hand, the UE 2 sends (G−1) data symbols and a sum of the symbols during the first time period [S315]. Namely, the UE 2 sends (G−1) data symbols during (G−1) time slots and also sends a sum of the previously sent (G−1) data symbols in the last time slot of the first time period.

Subsequently, the UE 2 also receives a feedback signal for the data symbols sent by the UE 2 from the base station [S325] and do not take any action during the second to $G^{th}$ time periods by stopping data transmission [S335].

Unlike the UE 1, the UE 2 does not send data in the $(G+1)^{th}$ time period as well [S345]. Namely, there is a difference that only the UE 1 sends a reconfigured signal to the base station in the $(G+1)^{th}$ time period.

Figure 4:
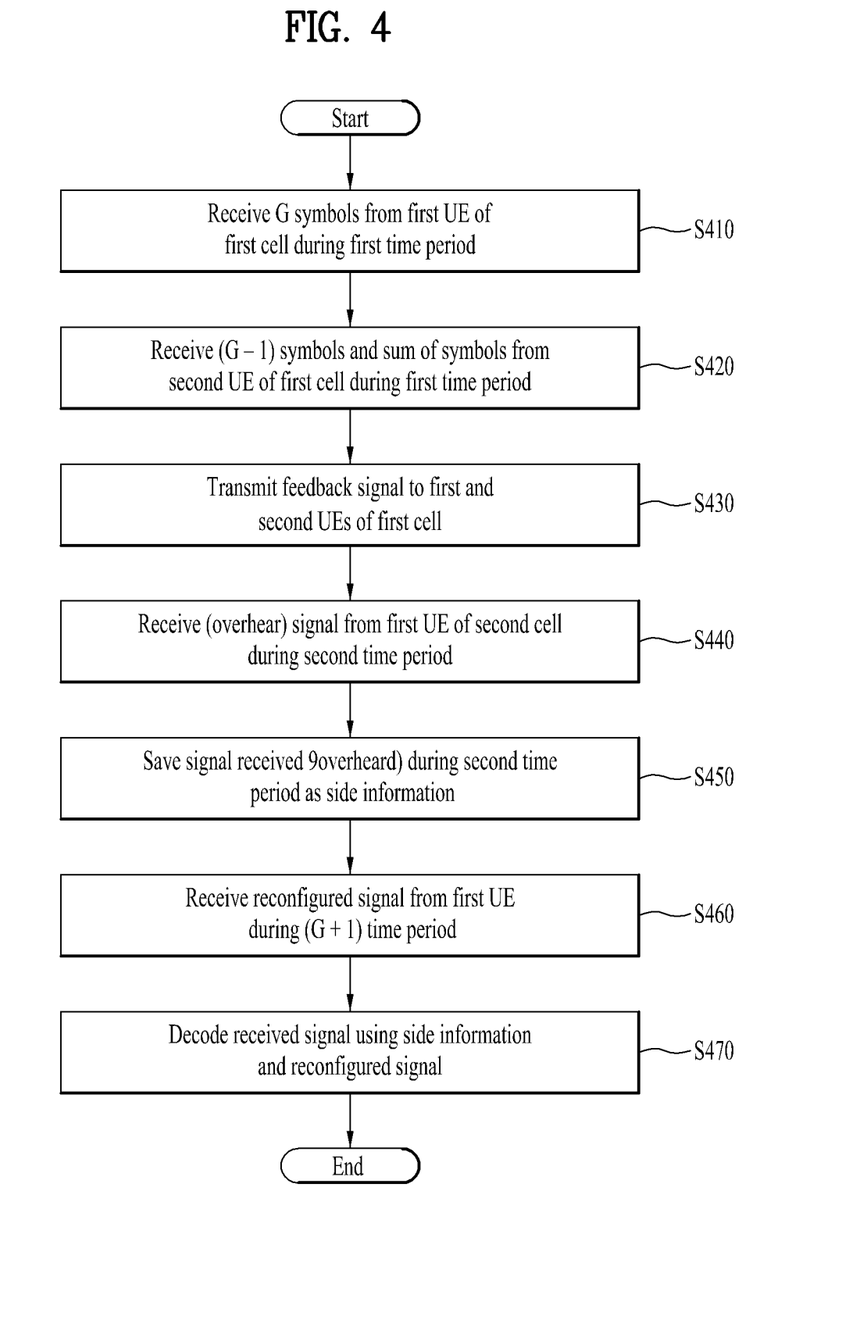
FIG. 4 is a diagram illustrating a method for a base station to communicate using outdated channel state information according to one embodiment of the present invention.

FIG. 4 is a diagram illustrating a method for a base station to communicate using outdated channel state information according to one embodiment of the present invention. In FIG. 4, an operating process of the base station is described in response to the operations of the UEs 1 and 2 described in FIG. 3.

The base station of the cell 1 described in FIG. 3 receives G data symbols from the UE 1 during the first time period [S410]. As described in the step S310, the base station receives G data symbols sent by the UE 1 in each time slot. Meanwhile, the base station also receives (G−1) data symbols and a sum of the symbols from the UE 2 during the first time period [S420]. The contents described in the step S315 are similarly applicable to the step S420.

Meanwhile, the base station sends a feedback signal for the data symbols received during the first time period to each of the UE 1 and the UE 2 [S430].

Subsequently, the base station receives interference signals from UEs of another cell during the second time period. Namely, UEs belonging to the cell 2 send data during the second time period, and the base station receives (overhears) G data symbols sent by the UE 1 of the cell 2 during the second time period as the interference signal [S440]. Moreover, the base station receives (overhears) (G−1) data symbols and a sum of the data symbols sent by the UE 2 of the cell 2 during the second time period as the interference signal [S450].

The base station performs a nulling process on the received interference signal, thereby saving side information related to the UE 1 of the cell 2 only [not shown explicitly].

Meanwhile, the steps S440 and S450 are performed repeatedly as many as G times corresponding to the number of cells. Namely, during the third time period, UEs belonging to the cell 3 send data and the base station 1 receives interference signals received from the UEs belonging to the cell 3 by overhearing. The received signals are saved as side information to the base station 1 through a nulling process. The corresponding process is repeated up to the $G^{th}$ time period, and the base station can store total (G−1) side informations.

Subsequently, the base station receives reconfigured signals from the UE I of the cell 1 and the UE 1 of another cell [S460]. Total G cells exist, and the base station receives the reconfigured signal from each of 2 cells including the cell 1 during the $(G+1)^{th}$ time period. Namely, the base station receives total (G−1) pairs of reconfigured signals from the cell 1 and (G−1) cells. The reconfigured signal received from the UE 1 of the cell 1 among the reconfigured signals is received as a preferred signal, but the reconfigured signal received from the UE 1 of another cell is received as an interference signal.

The base station obtains an additional equation for decoding the data symbols received in the first time period using the reconfigured signal received in the step S460 and the side information stored in the base station. Namely, the base station processes the (G−1) pairs of the reconfigured signals together with the (G−1) side informations stored in the base station, thereby generating (G−1) additional equations related to the UE 1 only.

The base station retains total [G+(G−1)] equations including the G equations consisting of the data symbols received in the first time period and the (G−1) additional equations generated from processing the reconfigured signals and the side informations. Hence, the base station retains equations enough to decode the G data symbols received from the UE 1 in the first time period and the (G−1) data symbols received from the UE 2. Namely, the base station decodes the received signal using the equations [S470].

Figure 5:
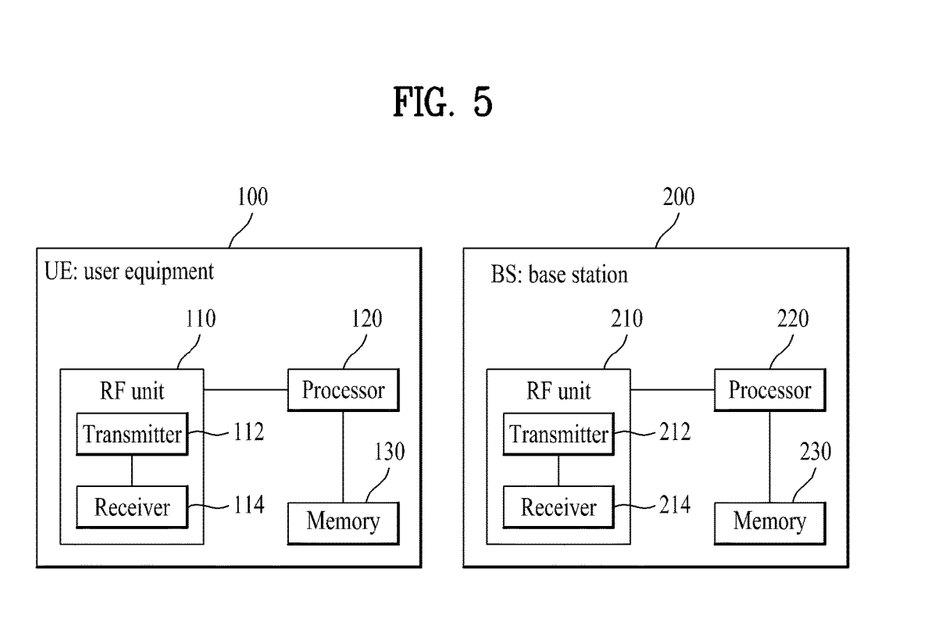
FIG. 5 is a diagram showing a configuration of a user equipment and a base station related to one embodiment of the present invention.

FIG. 5 is a diagram showing a configuration of a user equipment and a base station related to one embodiment of the present invention.

In FIG. 5, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 5, a communication environment may be established between a plurality of user equipment and the base station. In addition, the base station 200 shown in FIG. 5 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other user equipments and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may save information included in an exchanged message to the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may save information included in an exchanged message to the memory 230. By this structure, the base station 200 may perform the methods of the various embodiments of the present invention.

The processors 120 and 220 of the user equipment 100 and the base station 200 instruct (e.g., control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM, DVD, etc.).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A communication method, performed by a first user equipment located at a first cell using outdated channel information in a network environment including G cells (where G is an integer equal to or greater than 3) in each of which 2 user equipments are located, the communication method comprising:
    transmitting G different data symbols to a first base station in each time slot during a first time period including G time slots;
    receiving a feedback signal including channel information on the transmitted data symbols;
    stopping transmission of data during second to $G^{th}$ time periods, each including G time slots; and
    transmitting a reconfigured signal generated on the basis of the feedback signal during a $(G+1)^{th}$ time period including $[G*(G-1)/2]$ time slots.

2. The communication method of claim 1, wherein the transmitting the reconfigured signal comprises transmitting the reconfigured signal in (G−1) time slots during the $(G+1)^{th}$ time period.

3. The communication method of claim 2, wherein the transmitting the reconfigured signal comprises transmitting the reconfigured signal in each of the (G−1) time slots together with first user equipments included in (G−1) cells except the first cell.

4. The communication method of claim 1, wherein during the first time period, a second user equipment included in the first cell transmits (G−1) different data symbols to the first base station in each of (G−1) time slots and also transmits a sum of the (G−1) different data symbols to the first base station in 1 time slot.

5. The communication method of claim 1, wherein a second user equipment included in the first cell stops transmission of data during the $(G+1)^{th}$ time period.

6. A communication method, performed by a first base station located at a first cell using outdated channel information in a network environment including G cells (where G is an integer equal to or greater than 3) in each of which 2 user equipments are located, the communication method comprising:

receiving G different data symbols from a first user equipment located at the first cell in each time slot during a first time period including G time slots;

during the first time period, receiving (G−1) different data symbols in each of (G−1) time slots and a sum of the (G−1) different data symbols in 1 time slot;

during second to $G^{th}$ time periods, each including G time slots, receiving signals transmitted by user equipments located at second to $G^{th}$ cells as interference signals;

receiving a first reconfigured signal from the first user equipment during a $(G+1)^{th}$ time period including [G* (G−1)/2] time slots;

during the $(G+1)^{th}$ time period, receiving a second reconfigured signal from a different user equipment located at one of the second to $G^{th}$ cells; and decoding data symbols received during the first time period based on the interference signals, the first reconfigured signal and the second reconfigured signal.

7. The communication method of claim 6, further comprising transmitting a feedback signal including channel information on signals received during the first time period to each of the first user equipment and the second user equipment, wherein the first reconfigured signal is generated based on the feedback signal.

8. The communication method of claim 6, further comprising:

performing a nulling process on (G−1) interference signals received during the second to $G^{th}$ time periods; and saving (G−1) data generated through the nulling process as side information.

9. The communication method of claim 8, wherein the receiving the first reconfigured signal and the receiving the second reconfigured signal comprise receiving reconfigured signals in (G−1) time slots during the $(G+1)^{th}$ time period.

10. The communication method of claim 8, wherein the receiving the first reconfigured signal and the receiving the second reconfigured signal comprise receiving a pair of reconfigured signals from the first user equipment and the different user equipment in each of the (G−1) time slots.

11. The communication method of claim 9, the decoding, comprising:

processing a pair of the reconfigured signals into a signal related to a single user equipment only using the side information; and obtaining (G−1) additional informations for decoding the data symbols by performing the processing on (G−1) side informations and the reconfigured signal pair.

* * * * *

UNITED STATES PATENT AND TRADEMARK OFFICE
CERTIFICATE OF CORRECTION

PATENT NO. : 10,181,889 B1
APPLICATION NO. : 15/745283
DATED : January 15, 2019
INVENTOR(S) : Kilbom Lee et al.

Page 1 of 1

It is certified that error appears in the above-identified patent and that said Letters Patent is hereby corrected as shown below:

On the Title Page

After (87) PCT Pub. No.: WO2017/010599
      PCT Pub. Date: Jan. 19, 2017

Please insert:
--(65) Prior Publication Data
US 2019/0007118 A1 Jan. 3, 2019--

Signed and Sealed this
Ninth Day of April, 2019

Andrei Iancu
*Director of the United States Patent and Trademark Office*